(12) United States Patent
Arakawa

(10) Patent No.: US 6,801,647 B1
(45) Date of Patent: Oct. 5, 2004

(54) METHOD AND APPARATUS FOR EVALUATING DIGITAL RADIATION IMAGE

(75) Inventor: Satoshi Arakawa, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/553,179

(22) Filed: Apr. 20, 2000

(30) Foreign Application Priority Data

Apr. 20, 1999 (JP) .......................................... 11-112235

(51) Int. Cl.⁷ ............................................... G06K 9/00
(52) U.S. Cl. ..................................... 382/132; 378/207
(58) Field of Search ................................ 382/128, 131, 382/132; 378/165, 207

(56) References Cited

U.S. PATENT DOCUMENTS 5,420,441 A * 5/1995 Newman et al. ............ 250/581
5,462,832 A * 10/1995 Iwasaki ....................... 430/139
5,574,768 A * 11/1996 McLean ....................... 378/185

* cited by examiner

Primary Examiner—Jon Chang
Assistant Examiner—Charles Kim
(74) Attorney, Agent, or Firm—Sughrue Mion, PLLC

(57) ABSTRACT

The digital radiation image evaluating method and apparatus record previously at least two radiation images with different exposed doses of the radiation, determine a value of evaluation of at least one of granularity and image quality of a digital radiation image for each of at least two digital radiation images obtained from at least two radiation images to obtain at least two values of evaluation, construct from at least two values of evaluation a correction curve for the value of evaluation to the exposed dose of the radiation and calculate by means of the correction curve the value of evaluation of the digital radiation image of a given dose exposed to the radiation. By the method and apparatus, the correct value of evaluation of the granularity and image quality of digital radiation image can be obtained for precisely predetermined doses exposed to radiation.

22 Claims, 3 Drawing Sheets

METHOD AND APPARATUS FOR EVALUATING DIGITAL RADIATION IMAGE

BACKGROUND OF THE INVENTION

This invention relates to the technology of evaluating the granularity or image quality of digital radiation image. In particular, the invention relates to a method and an apparatus for evaluating the granularity or image quality of digital radiation image with x-rays by means of a digital radiographic apparatus.

Various diagnostic techniques using x-rays and other radiations are currently practiced in the medical field. In those techniques, x-rays or other radiations that have passed through the object are detected to generate an analog image for use in medical diagnosis, as exemplified by time-honored chest radiography.

In recent years, various digital radiation images such as those produced by DR (digital radiography), CT (computed tomography) and MRI (magnetic resonance imaging) are presented on CRT displays or output from printers for use in clinical settings to diagnose diseases. Among these digital radiation images, those produced by DR with CR (computed radiography) systems using x-rays are most popular in the medical field.

In a CR system, an x-ray detector coated with a stimulable phosphor (i.e., a stimulable phosphor sheet) is contained in a light-shielding case (so-called cassette) and exposed to x-rays that have passed through the object. The exposed stimulable phosphor sheet is taken out of the cassette and the entire portion of its recording surface is scanned with laser beam optics. Upon excitation by the laser beam, the stimulable phosphor in the sheet gives off an emission of stimulated light in proportion to the absorbed dose of x-rays. The emitted light is collected by a focus guide, detected with a photosensor and later objected to digital conversion to produce digital image data. The digital image data is then objected to various processes such as gradation treatment and spatial frequency enhancement and the processed image is presented on a CRT display or output from a printer.

Since the digital image produced from the CR system is principally composed of digital data, it can be modified in a desired manner by means of various filters such as the above-mentioned gradation treatment and spatial frequency enhancement. Take, for example, medical x-ray image; to insure safety for the patient, the dose of exposure to x-rays should be held to a minimum and the resulting digital image is objected to gradation treatment so that images of comparable gradation and density can be produced independently of the exposed dose of x-rays.

The granularity of digital image is ascribable to three major causes, fluctuation in x-rays, fluctuation in the light emitted from a stimulable phosphor, and the structure of a stimulable phosphor sheet. Digital image can be recorded with a wide range of exposure to x-rays and a specific dose is chosen for the particular object of recording. Since the granularity and image quality of digital image are largely dependent on the exposed dose of x-rays, they must be tested and evaluated under constant exposure conditions. However, applying the correct and constant dose of x-rays on every occasion of testing or evaluation is difficult and the difference in exposed dose leads to an error in the data of testing or evaluation.

Under these circumstances, the CR system requires that the degree of granularity of radiation image and its image quality be constantly monitored and controlled so that the appropriate and refined diagnosis can be performed consistently on the basis of the recorded image. To meet these requirements, the granularity and image quality of the radiation image obtained by the CR system have to be known for predetermined doses of exposure to x-rays. Conventionally, exact matching to predetermined doses of exposure to x-rays has been impossible and the resulting errors have caused errors in evaluation of the granularity and image quality of the radiation image produced by the CR system. This difficulty in achieving correct control over the values of evaluation of the granularity and image quality of radiation image from the CR system is not limited to x-rays and is also encountered in the image of other radiations such as $\alpha$- and $\beta$-rays.

SUMMARY OF THE INVENTION

The present invention has been accomplished under these circumstances to solve such problems that cannot obtain precisely values of evaluation of the granularity and the image quality of the digital radiation image for predetermined dose exposure to radiation and has as an object providing a method by which the correct values of evaluation of the granularity and image quality of digital radiation image can be obtained for precisely predetermined doses exposed to radiation.

Another object of the invention is to provide an apparatus for implementing the method.

The first object of the present invention can be attained by a method for evaluating a digital radiation image which obtains the digital radiation image from a radiation image recorded with a given dose exposed to a radiation and then evaluates for at least one of granularity and image quality of the thus obtained digital radiation image, comprising the steps of recording previously at least two radiation images with different exposed doses of the radiation, obtaining at least two digital radiation images from the at least two radiation images, determining a value of evaluation of at least one of the granularity and the image quality of the digital radiation image for each of the thus obtained at least two digital radiation images to obtain at least two values of evaluation, constructing from the at least two values of evaluation a correction curve for the value of evaluation to the exposed dose of the radiation and calculating by means of the correction curve the value of evaluation of the at least one of the granularity and the image quality of the digital radiation image obtained from the radiation image recorded with the given dose exposed to the radiation.

In a preferred embodiment, the digital radiation image is a digital radiation image produced by objecting to predetermined processes the radiation image recorded with a phosphor material that emits stimulated light in proportion to the exposed dose of the radiation, the value of evaluation is a square value of RMS granularity or a value of a Wiener spectrum at each frequency for evaluating the granularity of the digital radiation image, the correction curve for the value of evaluation to the exposed dose of the radiation X is expressed as A/X+B (where A and B are constants) and constructed by determining the constants A and B from the at least two values of evaluation.

In another preferred embodiment, the digital radiation image is a digital radiation image produced by objecting to predetermined processes the radiation image recorded with a phosphor material that emits stimulated light in proportion to the exposed dose of the radiation, the value of evaluation is an NEQ value for evaluating the image quality of digital radiation image, the correction curve for the value of evaluation to the exposed does of the radiation X is expressed as $1/(C/X+D)$ (where C and D are constants) and constructed by determining the constants C and D from the at least two values of evaluation.

In yet another preferred embodiment, the digital radiation image is a digital radiation image produced by objecting to predetermined processes the radiation image formed on a radiation detector coated with a phosphor material that emits stimulated light in proportion to the exposed dose of the radiation, the radiation detector is divided into at least two regions, split recording is performed by applying different exposed doses of the radiation to the at least two regions so as to produce the at least two radiation images with different exposed doses of the radiation.

Preferably, the digital radiation image is used as its image data which have been objected to logarithmic conversion.

The second object of the present invention can be attained by an apparatus for evaluating a digital radiation image produced by objecting to predetermined processes a radiation image which has been recorded on a radiation detector coated with a phosphor material that emits stimulated light in proportion to an exposed dose of a radiation, comprising a digital image acquiring device that records at least two radiation images with different exposed doses of the radiation either on one and same radiation detector by split recording or on separate radiation detectors and which applies predetermined processes on the recorded at least two radiation images to produce at least two digital radiation images, and at least one of: a granularity evaluating device which determines, from each of the at least two digital radiation images acquired by the digital image acquiring device, a square value of RMS granularity or a value of a Wiener spectrum at each frequency for evaluating the granularity of the digital radiation image, constructs from determined values a correction curve $A/X+B$ (where A and B are constants) as a function of the exposed dose of the radiation X, and calculates from the thus constructed correction curve a value of evaluated granularity for a given dose exposed to the radiation, and an image quality evaluating device which determines, from each of the at least two digital radiation images acquired by the digital image acquiring device, an NEQ value for evaluating image quality of the digital radiation image, constructs from determined values a correction curve $1/(C/X+D)$ (where C and D are constants) as a function of the exposed dose of the radiation X, and calculates from the thus constructed correction curve a value of evaluated image quality for a given dose exposed to the radiation.

DETAILED DESCRIPTION OF THE INVENTION

The digital radiation image evaluating apparatus according to the second aspect of the invention for implementing the digital radiation image evaluating method according to the first aspect of the invention is described below in detail with reference to the preferred embodiment shown in the accompanying drawings. The following description is directed to recording the radiation image with x-rays but this is not the sole case of the invention and image may be formed with other radiations such as $\alpha$- and $\beta$-rays.

Figure 1:
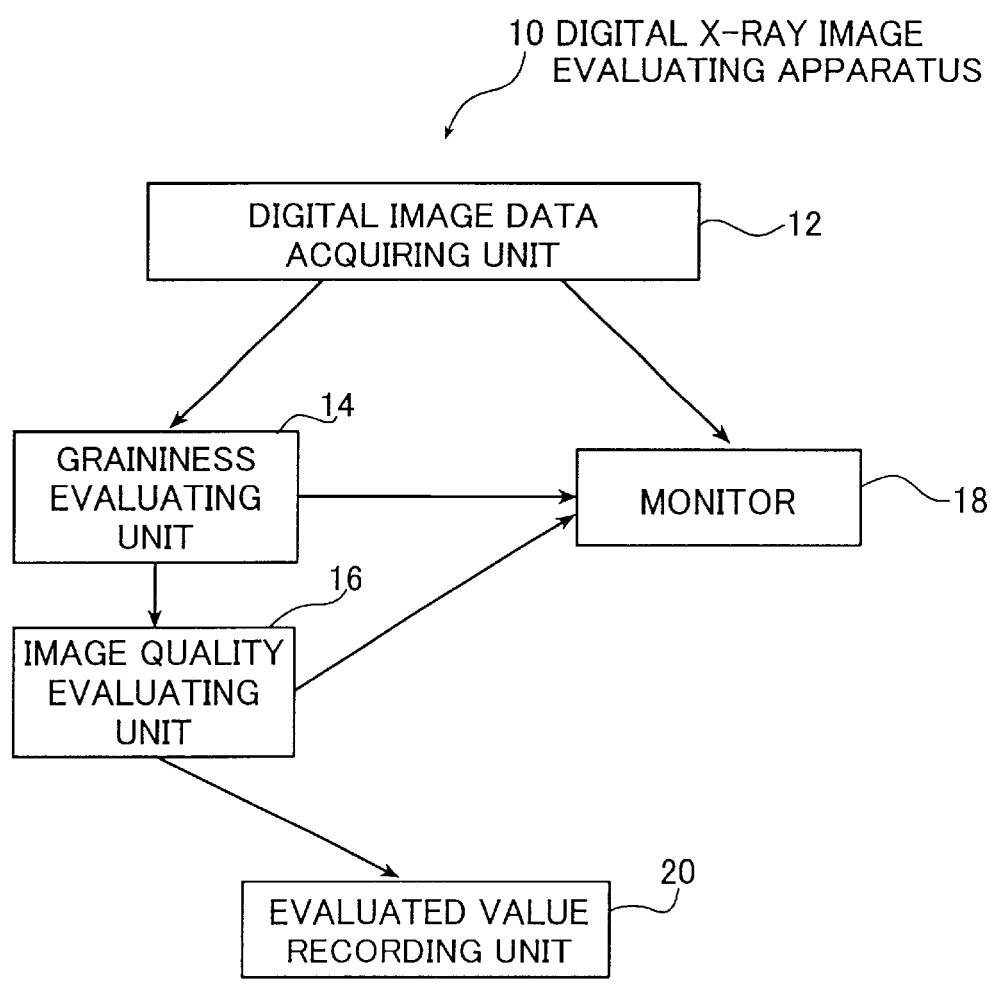
FIG. 1 is a block diagram showing schematically an embodiment of the digital radiation image evaluating apparatus according to the second aspect of the invention for implementing the digital radiation image evaluating method according to the first aspect of the invention.

FIG. 1 shows a digital x-ray image evaluating apparatus 10 which is a preferred embodiment of the digital radiation image evaluating apparatus according to the second aspect of the invention. Being intended to evaluate the granularity or image quality of digital radiation image (hereinafter referred to as simply "digital image") obtained with a digital x-ray image diagnostic system, the apparatus 10 consists of the following five basic components: a digital image data acquiring unit 12 for obtaining digital image data from the radiation image (hereinafter referred to as simply "image") recorded on a stimulable phosphor sheet which is a radiation detector of applied x-rays; a granularity evaluating unit 14 for evaluating the granularity of image in terms of a square value of RMS granularity or a value of a Wiener spectrum at each frequency; an image quality evaluating unit 16 for evaluating image quality in terms of an NEQ value which represents the signal-to-noise ratio of digital image; a monitor 18 which displays digital image from the obtained digital image data and gives graphic presentation for calculating the values of evaluated granularity or image quality, or both; and an evaluated value recording unit 20 for recording, keeping and controlling the evaluated values.

The stimulable phosphor sheet which is an x-ray detector to be processed with the digital x-ray image evaluating apparatus 10 is coated with a phosphor material (e.g. barium halide such as barium fluoride) that emits stimulated light in proportion to the exposed dose of x-rays. Split recording is performed on this stimulable phosphor sheet, namely, the recording area of the sheet is divided into at least two regions and recording is done in those regions with varying doses exposed to x-rays. Since the sheet is uniformly illuminated with x-rays that have passed through the object, the resulting images contain noise components due to the fluctuation in x-rays and the structure of the stimulable phosphor sheet.

The following description assumes that split recording is done on a single stimulable phosphor sheet with different doses of exposure to x-rays but the present invention is in no way limited to this case and image may be recorded on separate stimulable phosphor sheets with different doses of exposure to x-rays.

In the digital image data acquiring unit 12, the x-ray images recorded on the stimulable phosphor sheet are scanned with a predetermined laser beam such as a He-Ne laser beam so that the phosphor material emits stimulated light in proportion to the exposed dose of x-rays and the emitted light is converted to electrical signal by means of a photosensor.

To be more specific, the laser beam issuing from a light source has its diameter increased by a beam expander and scanned one-dimensionally (in a main-scan direction) with an optical deflector such as a galvanometer mirror, a polygon mirror or a resonant scanner. The scanned laser beam is focused by an $f\theta$ lens to form an image of a predetermined beam size in a predetermined reading position. The phosphor sheet on which the radiation images have been recorded is transported in a sub-scan direction perpendicular to the main-scan direction by means of a transport unit comprising rollers and an endless belt as the surface of the sheet is kept in the reading position.

Since the laser beam scans in the main-scan direction, the entire surface of the phosphor sheet being transported in the sub-scan direction is eventually scanned with the laser beam in a two-dimensional fashion.

As the phosphor sheet is scanned with the laser beam, stimulated light is successively emitted in correspondence with the recorded radiation image. The emitted light propagates through an optical guide, has the unwanted component rejected by a filter, and read photoelectrically with a photomultiplier. The output signal from the photomultiplier is obtained as an image signal for the radiation image and, after log conversion, it is objected to A/D conversion to produce digital image data which represents the gradation values of the pixels in the digital image.

As already mentioned, the recording area of the stimulable phosphor sheet is divided into at least two regions and split recording has been done with different doses of exposure to x-rays. On the other hand, the whole sheet is scanned with the laser beam so that the images obtained by split recording with different doses of exposure to x-rays are captured at a time.

The monitor 18 displays the digital image obtained by scanning the entire surface of the stimulable phosphor sheet; it then splits the image into a plurality of segments and obtains evaluated values of granularity and image quality for each segment.

In the case where images were recorded on separate stimulable phosphor sheets with different doses of exposure to x-rays, digital images are individually displayed on the monitor 18.

The granularity evaluating unit 14 is one of the two characterizing parts of the invention and evaluates the granularity of image produced by the digital x-ray image diagnostic system. It performs evaluation in terms of the square value of RMS granularity or the value of a Wiener spectrum (WS value) for each dose of exposure to x-rays.

Consider here the gradation values of pixels in a train of image data for one line or the average of two or more lines in a given direction of the image represented by the digital image data captured in the digital image data acquiring unit 12; the square value of RMS granularity is the sum of the squares of the difference between the gradation value for one or more lines in the given direction and the mean value; in other words, the square value of RMS granularity is the square of root-mean-square variation. The thusly defined square value of RMS granularity can be obtained in both directions of the image; in the embodiment under consideration, the square value of RMS granularity is provided for both the main-scan direction, in which the laser beam is scanned to capture data with the digital image data acquiring unit 12, and the sub-scan direction which is perpendicular to the main-scan direction.

The WS value is the value at a given spatial frequency of a power spectrum obtained by calculating the Fourier transform of gradation values as image data. Since the WS value is one of evaluation which represents the noise component of image, the value of a Wiener spectrum is variable with the spatial frequency of interest.

In the granularity evaluating unit 14, the square value of RMS granularity is computed by a known conventional technique and the WS value is obtained by calculating the Fourier transform of gradation values as image data.

Since these values of evaluation are variable with the exposed dose of x-rays, a correction curve as a function of the exposed dose of x-rays is constructed from at least two values of evaluation obtained with different doses of exposure to x-rays and using this correction curve, one can determine a value of evaluation for a given dose of exposure to x-rays.

The image quality evaluating unit 16 evaluates image quality using an NEQ (noise equivalent quanta) which represents the signal-to-noise ratio of digital image and it is another characterizing part of the invention. The NEQ value is expressed by the following equation:

$$NEQ = \gamma^2 \times (\log_e 2)^2 \times MTE^2 / (WS \text{ value})^2$$

Thus, the NEQ value is proportional to a square value of MTF (modulation transfer function) divided by the WS value; the smaller the noise component (i.e., the WS value) and the greater the sharpness of image (i.e., the square value of MTF), the higher the NEQ value and the better the image quality.

In the image quality evaluating unit 16, the square value of MTF is determined by any known technique such as charting whereas the WS value is determined by taking the difference between a gradation value as image data and the mean of the gradation values for the entire image, calculating the Fourier transform of the differential data to give a power spectrum, and determining its value for a given spatial frequency. Using the thus obtained $MTF^2$ and WS value, one calculates the NEQ value.

Since the thus calculated NEQ value is variable with the exposed dose of x-rays, a correction curve as a function of the exposed dose of x-rays is constructed from at least two NEQ values obtained with different doses of exposure to x-rays and using this correction curve, one can determine a value of evaluation for a given dose of exposure to x-rays.

The monitor 18 displays the images obtained with the digital image acquiring unit 12; it also displays the values of evaluation obtained by the granularity evaluating unit 14 and the image quality evaluating unit 16. In the case where images were recorded in split areas of the sheet with different doses of exposure to x-rays, a single image is obtained by scanning the entire surface of the sheet, then divided into segments, and the evaluated values of granularity or image quality are determined for each segment of the image. The evaluated value recording unit 20 keeps the record of the evaluated values obtained by the granularity evaluating unit 14 and the image quality evaluating unit 16.

It should be noted here that an image display device such as the monitor 18 in the digital x-ray image evaluating apparatus 10 need not be provided within the digital image evaluating apparatus of the invention and it may be connected to the outside of said apparatus.

Having the construction described above, the digital x-ray image evaluating apparatus 10 operates in the following manner.

First, the recording area of the stimulable phosphor sheet which serves as an x-ray detector is divided into at least two regions, where split recording is done with different doses of exposure to x-rays. The method of split recording is not limited in any particular way; in one example, a specified area of the sheet is covered with an x-ray opaque metal plate such as a lead plate and the uncovered area of the sheet is illuminated with a predetermined dose of x-rays; thereafter, the lead plate is removed and replaced over another specified area of the sheet and the uncovered area is illuminated with a different dose of x-rays; this procedure is repeated until the required number of images are recorded.

In the digital image data acquiring unit 12, the stimulable phosphor sheet coated with a phosphor material which emits stimulated light in proportion to the dose of exposure to x-rays is illuminated with x-rays and scanned with a predetermined laser beam. As the phosphor sheet is scanned with the laser beam, stimulated light is successively emitted in correspondence with the recorded radiation image. The emitted light propagates through an optical guide, has the unwanted component rejected by a filter, and read photoelectrically with a photomultiplier to produce an electrical signal. The electrical signal is objected to log conversion and A/D conversion to produce digital image data, which is sent to the monitor 18 for image display.

In the embodiment under consideration, the stimulable phosphor sheet is divided into two regions, where split recording is done with different doses of exposure to x-rays. The entire surface of the phosphor sheet is scanned to produce a single image which is then divided into segments. This method provides an easier way to produce two images with different doses of exposure to x-rays.

In the next step, the obtained images are evaluated for granularity. Evaluation of granularity is performed in the granularity evaluating unit 14 to give evaluated values of granularity for predetermined doses of exposure to x-rays.

The process starts with calculating the square value of RMS granularity (which is hereunder referred to as "RMS") or the WS value for a given spatial frequency. To calculate the first parameter, the square value of RMS for the gradation values of pixels on a predetermined line in one direction of the image is computed by a known conventional technique. The WS value is determined by taking the difference between a gradation value as image data and the mean of the gradation values for the entire image, calculating the Fourier transform of the differential data to give a power spectrum, and determining its value for a given spatial frequency. Since the square value of RMS and the WS value are obtained from a plurality of split images produced with different doses of exposure to x-rays, data on the square value of RMS or the WS value is obtained for each image and a total of at least two square values of RMS or at least two WS values are determined.

The next step in the process comprises of plotting the thus obtained data for the square value of RMS or the WS value on a logarithmic graph, the horizontal axis of which represents the exposed dose of x-rays and the vertical axis representing the square value of RMS or the WS value. Since at least two images were produced with different doses of exposure to x-rays, data for at least two square values of RMS or at least two WS values are plotted on the graph. The square values of RMS can be plotted for each of the main- and sub-scan directions.

Then, on the basis of the plotting of at least two values of data, a correction curve is constructed for the square value of RMS or the WS value. Since the correction curve is generally expressed by A/X+B (where A and B are constants) as a function of the exposed dose of x-rays, the correction curve for the square value of RMS or the WS value is constructed by determining the constants A and B in such a way that it passes through at least two plotted data points. If at least three data points are plotted, a correction curve can be constructed by any known technique such as curve fitting based on the method of least squares. Whichever method is employed, the plotted data may be weighted.

If the constants A and B are determined in such a way that the correction curve passes through two plotted data points on the graph, it has no big difference from a correction curve constructed by connecting three or more plotted data points on the graph. Conventionally, two plotted data points are linearly interpolated to construct a correction curve but precise values of evaluation cannot be obtained for a given dose of exposure to x-rays. This problem can be solved by the invention although it uses two data points.

It was not known before the present invention that curves for correcting granularity can mathematically be expressed as a function and this is a unique feature of digital radiation image that is absent from the conventional analog radiation image. In the case of x-rays, the correction curve is expressed by A/X+B (where A and B are constants) as a function of exposed dose X. In the high-exposure region, granularity remains the same irrespective of the exposed dose but in the low-exposure region, granularity increases sharply with the decreasing exposed dose. This can be explained as follows: the granularity of image produced by the digital x-ray image diagnostic system is generally ascribable to the fluctuation in x-rays, the fluctuation in the light emitted from the phosphor material and the structural noise of the stimulable phosphor sheet, and in the low-exposure region, the noise from the fluctuation in x-rays becomes predominant.

This phenomenon is not limited to x-rays but similarly encountered with other radiations such as $\alpha$- and $\beta$-rays. Therefore, the concept of the present invention is also applicable to radiations other than x-rays.

Figure 2:
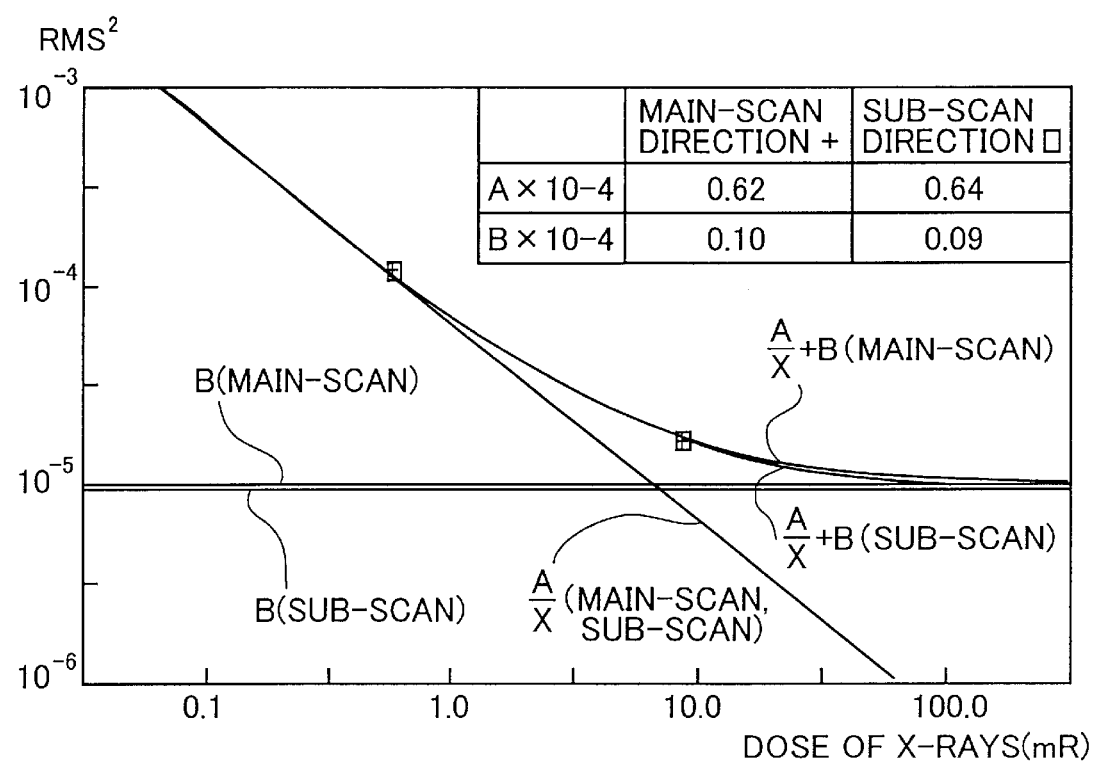
FIG. 2 is a graph illustrating how the granularity of image is evaluated by the invention.

FIG. 2 is a graph illustrating how the granularity of image is evaluated according to the invention. Two square values of RMS for different doses of exposure to x-rays are plotted on a logarithmic scale for both the main- and sub-scan directions by symbols+ and □, respectively. A correction curve A/X+B constructed by determining unknowns A and B is superposed for each direction, and so are the terms A/X and B.

The thus determined constants A and B are shown in the upper right section of the graph in FIG. 2, from which one can see that constant A for the main-scan direction is $0.62 \times 10^{-4}$ and constant B for the same direction is $0.10 \times 10^{-4}$.

FIG. 2 shows how to construct correction curves using the square value of RMS. Of course, correction curves can also be constructed using the WS value.

The two values of $RMS^2$ which were used in constructing the correction curves shown in FIG. 2 are listed in the "measured $RMS^2$" column of Table 1 for each of the main- and sub-scan directions together with the exposed dose of x-rays. The data in the "calculated $RMS^2$" column of Table 1 represent the calculated values of $RMS^2$ which were computed from the correction curves for the doses of exposure to x-rays that were used in the measurement. Since unknowns A and B in the correction curve A/X+B were determined from the two actual data on $RMS^2$, there is no difference between the measured and calculated values of $RMS^2$ shown in Table 1. In the lower part of the "calculated $RMS^2$" column, the values of $RMS^2$ for the main- and sub-scan directions are listed for four different doses of x-rays, 0.1 mR, 1.0 mR, 10 mR and 100 mR. From these calculated values, one can evaluate the square value of RMS for a given dose of exposure to x-rays, for example, 0.1 mR or 1.0 mR.

The foregoing discussion concerns the square value of RMS but this may be replaced by the WS value.

TABLE 1

| Dose of x-rays, mR | Measured $RMS^2$ | Calculated $RMS^2$ |
|---|---|---|
| Main-scan direction | | |
| 0.5588 | 1.2263E−04 | 1.2263E−04 |
| 8.6893 | 0.1734 | 0.1734 |

TABLE 1-continued

| Dose of x-rays, mR | Measured RMS$^2$ | Calculated RMS$^2$ |
|---|---|---|
| Sub-scan direction | | |
| 0.5588 | 1.2947 | 1.2497 |
| 8.6893 | 0.1686 | 0.1686 |
| Main-scan direction | | |
| 0.1000 | | 6.3889 |
| 1.0000 | | 0.7298 |
| 10.0000 | | 0.1639 |
| 100.0000 | | 0.1073 |
| Sub-scan direction | | |
| 0.1000 | | 6.5504 |
| 1.0000 | | 0.7399 |
| 10.0000 | | 0.1589 |
| 100.0000 | | 0.1007 |

Following the evaluation of granularity of the image, its image quality is then evaluated. This process is performed in the image quality evaluating unit 16 to obtain the NEQ value which is a measure of evaluation of image quality for a given dose of exposure to x-rays.

The process starts with calculating the NEQ value. To this end, data of at least two NEQ values are obtained from a plurality of images produced by split recording in divided regions of the stimulable phosphor sheet with different doses of exposure to x-rays.

The NEQ value is proportional to the square value of MTF divided by the WS value. Since the MTF and WS values are each dependent on spatial frequency, the NEQ value is determined for each spatial frequency. MTF can be determined by any known technique such as charting or slitting. The WS value is determined by taking the difference between a gradation value as image data and the average of the gradation values for the entire image, calculating the Fourier transform of the differential data to give a power spectrum, and determining its value for a given spatial frequency. As mentioned earlier, the Wiener spectrum changes its value in the form of a correction curve $A/X+B$ as a function of X, or the exposed dose of x-rays. Since the NEQ value has the value of Wiener spectrum in the denominator, it varies in the form of $1/(C/X+D)$ (where C and D are constants) as a function of X. According to the invention, at least two NEQ values are obtained from images recorded with different doses of exposure to x-rays and, on the basis of these values, unknown constants C and D are determined to construct the correction curve $1/(C/X+D)$.

Unknowns C and D in the correction curve can be calculated by the same method as employed for the square value of RMS. The measured data are plotted on a logarithmic graph the horizontal axis of which represents the exposed dose of x-rays and the vertical axis the NEQ value. Since at least two images were produced with varying doses of exposure to x-rays, data on at least two NEQ values are plotted on the graph. Considering the dependency of NEQ value on spatial frequency, the NEQ value is plotted at given intervals of spatial frequency, say, 0.5 cycles/mm.

Then, on the basis of the plotting of at least two values of data, a correction curve is constructed for the NEQ value. The correction curve $1/(C/X+D)$ is constructed by determining the constants C and D in such a way that it passes through at least two plotted data points. If at least three data points are plotted, a correction curve can be constructed by any known technique such as curve fitting based on the method of least squares. Whichever method is employed, the plotted data may be weighted.

If the constants C and D are determined in such a way that the correction curve passes through two plotted data points on the graph, it has no big difference from a correction curve constructed by connecting three or more plotted data points on the graph. Conventionally, two plotted data points are linearly interpolated to construct a correction curve but precise values of evaluation cannot be obtained for a given dose of exposure to x-rays. This problem can be solved by the invention although it uses two data points.

Figure 3:
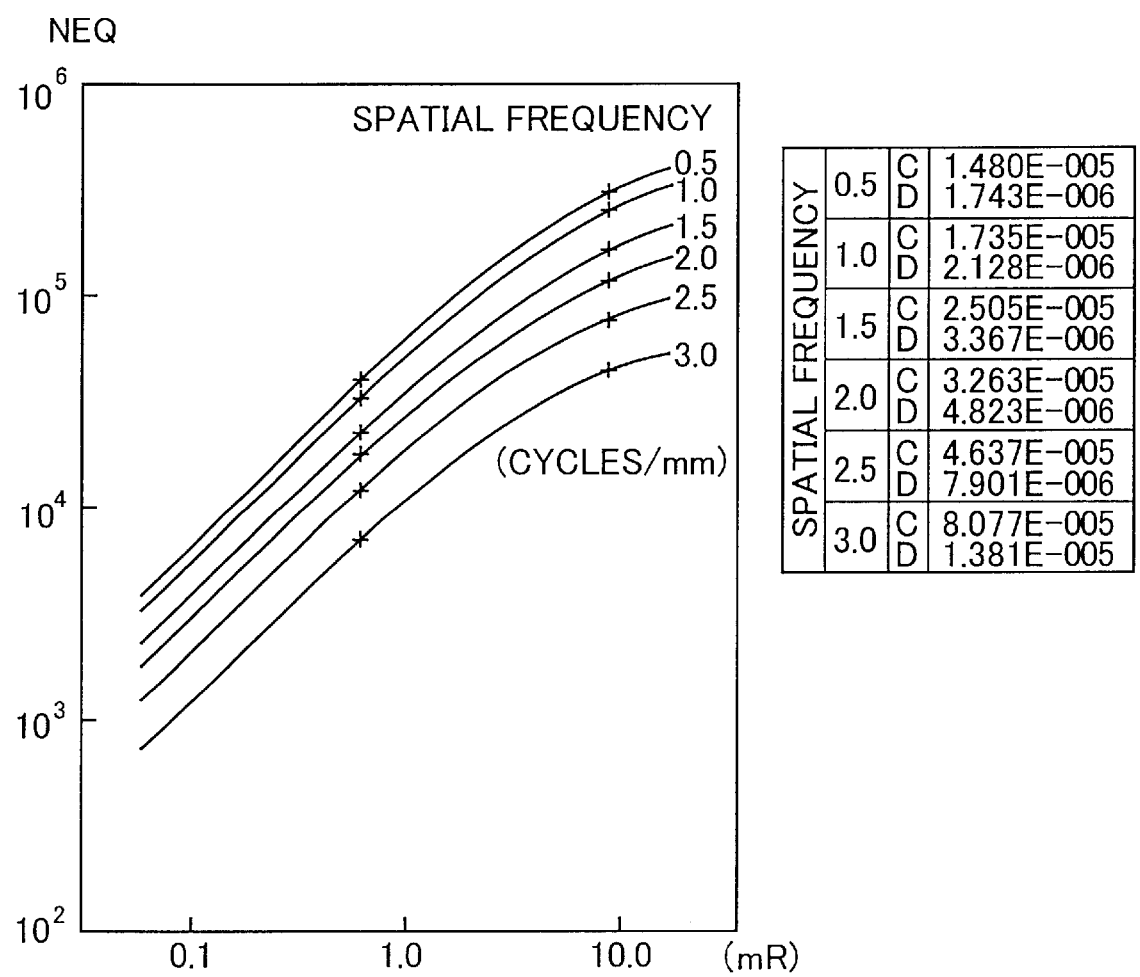
FIG. 3 is a graph illustrating how the image quality is evaluated by the invention.

FIG. 3 is a graph illustrating how image quality is evaluated according to the invention. Two NEQ values for different doses of exposure to x-rays are plotted for the spatial frequency range from 0.5 cycles/mm to 3.0 cycles/mm at intervals of 0.5 cycles/mm. A correction curve $1/(C/X+D)$ constructed by determining unknowns C and D is superposed.

The thus determined constants C and D are shown in the column on the right side of the graph in FIG. 3, from which one can see that for the spatial frequency of 0.5 cycles/mm, constant C is $1.480 \times 10^{-5}$ and constant D is $1.743 \times 10^{-6}$. In this way, the correction curve for NEQ value is constructed.

The NEQ values which were measured in constructing the correction curves shown in FIG. 3 are listed in the first and second rows of Table 2 at spatial frequency intervals of 0.5 cycles/mm for two x-ray exposure doses, 0.592 mR and 9.237 mR. In the third, fourth and fifth rows of Table 2, calculated NEQ values are listed for three different doses of x-rays, 0.1 mR, 1.0 mR and 10 mR, on the constructed correction curves. From these calculated values, one can evaluate the NEQ value for a given dose of exposure to x-rays, for example, 0.1 mR or 1.0 mR.

TABLE 2

| Dose of x-rays, | Spatial frequency, cycles/mm | | | | | |
|---|---|---|---|---|---|---|
| mR | 0.50 | 1.00 | 1.50 | 2.00 | 2.50 | 3.00 |
| 0.592 | 3.74E+04 | 3.18E+04 | 2.19E+04 | 1.67E+04 | 1.16E+04 | 5.66E+03 |
| 9.237 | 2.99E+05 | 2.50E+05 | 1.64E+05 | 1.20E+05 | 7.74E+04 | 4.43E+04 |
| 0.100 | 6.68E+03 | 5.69E+03 | 3.94E+03 | 3.02E+03 | 2.12E+03 | 1.22E+03 |
| 1.000 | 6.04E+04 | 5.13E+04 | 3.52E+04 | 2.67E+04 | 1.84E+04 | 1.06E+04 |
| 10.000 | 3.10E+05 | 2.59E+05 | 1.70E+05 | 1.24E+05 | 7.98E+04 | 4.57E+04 |

When the square value of RMS or the WS value which are measures for evaluation of granularity and the NEQ value which is a measure for evaluation of image quality are determined by the granularity evaluating unit 14 and the image quality evaluating unit 16, respectively, the graphs illustrated in FIGS. 2 and 3, as well as the data sheets shown in Tables 1 and 2 are displayed on the monitor 18 as needed.

By looking at the display, the operator can evaluate and control the granularity of image and its image quality. If the displayed data are stored in the evaluated value recording unit 20 and evaluation is performed at given time intervals, time-dependent changes in the granularity of image and its image quality can be recorded for monitoring.

In the example described above, the image data obtained have been objected to logarithmic conversion, so correction curves can be easily constructed on a logarithmic graph. However, this is not the sole case of the invention and correction curves may be constructed from non-converted image data.

As described on the foregoing pages, the method of the invention for evaluating digital radiation image is characterized by evaluating at least one of the granularity and the image quality for a given dose of exposure to x-rays on the basis of correction curves for granularity caused by inherent noise components of a digital image producing system. If desired, a film on which a picture was taken with a conventional camera may be illuminated with visible light to produce projected light bearing the image information for the recorded picture (image); the projected light is detected with a photosensor to produce an electrical signal, which is objected to log conversion and A/D conversion to produce digital image data. The granularity of the resulting digital image from the taking film and its image quality can be evaluated by the same method as applied for the digital x-ray image.

It should also be noted that the present invention is by no means limited to the foregoing example and various improvements and modifications may of course be made without departing from the scope and spirit of the invention.

As will be apparent from the foregoing description, the evaluating method and apparatus of the invention record at least two images with different doses of exposure to a radiation, obtain at least two values of evaluation of granularity or image quality for each of the digital images generated on the basis of the radiation images, construct from the at least two values of evaluation a correction curve for the values of evaluation to the exposed dose of radiation, and determine with the correction curve the value of evaluation of the granularity or image quality of a digital image for a given dose of exposure to radiation. By these method and apparatus, the correct values of evaluation of at least one of the granularity and image quality of digital radiation image can be obtained for predetermined doses of exposure to radiation. As a result, consistent and refined diagnoses can be provided in clinical settings.

What is claimed is:

1. A method for evaluating a digital radiation image which obtains the digital radiation image from a radiation image recorded with a given dose exposed to a radiation and then evaluates thus obtained digital radiation image, comprising the steps of:

recording previously at least two radiation images with different exposed doses of the radiation;

obtaining at least two digital radiation images from said at least two radiation images;

determining a value of evaluation of at least one of the granularity and the image quality of the digital radiation image for each of the thus obtained at least two digital radiation images to obtain at least two values of evaluation;

constructing from said at least two values of evaluation a correction curve for the value of evaluation to the exposed dose of the radiation; and calculating by means of said correction curve the value of evaluation of said at least one of the granularity and the image quality of the digital radiation image obtained from the radiation image recorded with the given dose exposed to the radiation, wherein said digital radiation image is a digital radiation image produced by objecting to predetermined processes the radiation image recorded with a phosphor material that emits stimulated light in proportion to the exposed dose of the radiation, said value of evaluation is a square value of RMS granularity or a value of a Wiener spectrum at each frequency for evaluating the granularity of the digital radiation image, said correction curve for the value of evaluation to the exposed dose of the radiation X is expressed as A/X+B (where A and B are constants) and constructed by determining the constants A and B from said at least two values of evaluation.

2. The method for evaluating a digital radiation image according to claim 1, wherein said digital radiation image is produced by image data which have been objected to logarithmic conversion and A/D conversion.

3. The method according to claim 2, wherein the correction curve is constructed from said at least two values of evaluation for a plurality of spatial frequencies, and said at least two values of evaluation for evaluating image quality are determined according to a spatial frequency.

4. The method according to claim 2, wherein the correction curve is constructed from said at least two values of evaluation for a plurality of spatial frequencies, and said at least two values of evaluation for evaluating image quality are determined according to a sharpness value and a noise value.

5. The method according to claim 1, wherein said digital radiation image is used as its image data which have been objected to logarithmic conversion.

6. The method according to claim 1, wherein the images are recorded on separate stimulable phosphor sheets with different doses of exposure to x-rays.

7. The method according to claim 1, wherein said digital radiation image is a digital radiation image produced by objecting to predetermined processes the radiation image formed on a radiation detector coated with a phosphor material that emits stimulated light in proportion to the exposed dose of the radiation, said radiation detector is divided into at least two regions, split recording is performed by applying different exposed doses of the radiation to said at least two regions so as to produce said at least two radiation images with different exposed doses of the radiation.

8. A method for evaluating a digital radiation image which obtains the digital radiation image from a radiation image recorded with a given dose exposed to a radiation and then evaluates for at least one of granularity and image quality of the thus obtained digital radiation image, comprising the steps of:

recording previously at least two radiation images with different exposed doses of the radiation;

obtaining at least two digital radiation images from said at least two radiation images;

determining a value of evaluation of at least one of the granularity and the image quality of the digital radiation image for each of the thus obtained at least two digital radiation images to obtain at least two values of evaluation;

constructing from said at least two values of evaluation a correction curve for the value of evaluation to the exposed dose of the radiation; and calculating by means of said correction curve the value of evaluation of said at least one of the granularity and the image quality of the digital radiation image obtained from the radiation image recorded with the given dose exposed to the radiation, wherein said digital radiation image is a digital radiation image produced by objecting to predetermined processes the radiation image recorded with a phosphor material that emits stimulated light in proportion to the exposed dose of the radiation, said value of evaluation is an NEQ value for evaluating the image quality of digital value of evaluation of said at least one of the radiation image, said correction curve for the value evaluation to the exposed dose of the radiation X is expressed as 1/(C/X+D) (where C and D are constants) and constructed by determining the constants C and D from said at least two values of evaluation.

9. The method according to claim 8, wherein said digital radiation image is a digital radiation image produced by objecting to predetermined processes the radiation image formed on a radiation detector coated with a phosphor material that emits stimulated light in proportion to the exposed dose of the radiation, said radiation detector is divided into at least two regions, split recording is performed by applying different exposed doses of the radiation to said at least two regions so as to produce said at least two radiation images with different exposed doses of the radiation.

10. The method according to claim 8, wherein said digital radiation image is used as its image data which have been objected to logarithmic conversion.

11. The method according to claim 8, wherein said digital radiation image is produced by image data which have been objected to logarithmic conversion and A/D conversion.

12. The method according to claim 8, wherein the images are recorded on separate stimulable phosphor sheets with different doses of exposure to x-rays.

13. An apparatus for evaluating a digital radiation image produced by objecting to predetermined processes a radiation image which has been recorded on a radiation detector coated with a phosphor material that emits stimulated light in proportion to an exposed dose of a radiation, comprising:

a digital image acquiring device that records at least two radiation images with different exposed doses of the radiation either on one and same radiation detector by split recording or on separate radiation detectors and which applies predetermined processes on the recorded at least two radiation images to produce at least two digital radiation images; and a granularity evaluating device which determines, from each of said at least two digital radiation images acquired by said digital image acquiring device, a square value of RMS granularity or a value of a Wiener spectrum at each frequency for evaluating the granularity of the digital radiation image, constructs from determined values a correction curve A/X+B (where A and B are constants) as a function of the exposed dose of the radiation X, and calculates from the thus constructed correction curve a value of evaluated granularity for a given dose exposed to the radiation.

14. The apparatus according to claim 3, further comprising:

an image quality evaluating device which determines, from each of said at least two digital radiation images acquired by said digital image acquiring device, an NEQ value for evaluating image quality of the digital radiation image, constructs from determined values a correction curve 1/(C/X+D) (where C and D are constants) as a function of the exposed dose of the radiation X, and calculates from the thus constructed correction curve a value of evaluated image quality for a given dose exposed to the radiation.

15. An apparatus for evaluating a digital radiation image produced by objecting to predetermined processes a radiation image which has been recorded on a radiation detector coated with a phosphor material that emits stimulated light in proportion to an exposed dose of a radiation, comprising:

a digital image acquiring device that records at least two radiation images with different exposed doses of the radiation either on one and same radiation detector by split recording or on separate radiation detectors and which applies predetermined processes on the recorded at least two radiation images to produce at least two digital radiation images; and an image quality evaluating device which determines, from each of said at least two digital radiation images acquired by said digital image acquiring device, an NEQ value for evaluating image quality of the digital radiation image, constructs from determined values a correction curve 1/(C/X+D) (where C and D are constants) as a function of the exposed does of the radiation X, and calculates from the thus constructed correction curve a valve of evaluated image quality for a given dose exposed to the radiation.

16. A method for evaluating a digital radiation image which obtains the digital radiation image from a radiation image recorded with a given dose exposed to a radiation and then evaluates for granularity of the thus obtained digital radiation image, comprising the steps of:

recording previously at least two radiation images with different exposed doses of the radiation;

obtaining at least two digital radiation images from said at least two radiation images;

determining a value of evaluation of the granularity and the image quality of the digital radiation image for each of the thus obtained at least two digital radiation images to obtain at least two values of evaluation;

constructing from said at least two values of evaluation a correction curve for the value of evaluation to the exposed dose of the radiation; and calculating by means of said correction curve the value of evaluation of the granularity and the image quality of the digital radiation image obtained from the radiation image recorded with the given dose exposed to the radiation.

17. The method according to claim 16, wherein said digital radiation image is a digital radiation image produced by objecting to predetermined processes the radiation image recorded with a phosphor material that emits stimulated light in proportion to the exposed dose of the radiation, said value of evaluation is a square value of RMS granularity or a value of a Wiener spectrum at each frequency for evaluating the granularity of the digital radiation image, said correction curve for the value of evaluation to the exposed dose of the radiation X is expressed as A/X+B (where A and B are constants) and constructed by determining the constants A and B from said at least two values of evaluation.

18. The method according to claim 16, wherein said digital radiation image is a digital radiation image produced by objecting to predetermined processes the radiation image formed on a radiation detector coated with a phosphor material that emits stimulated light in proportion to the exposed dose of the radiation, said radiation detector is divided into at least two regions, split recording is performed by applying different exposed doses of the radiation to said at least two regions so as to produce said at least two radiation images with different exposed doses of the radiation.

19. The method according to claim 16 wherein said digital radiation image is used as its image data which have been objected to logarithmic conversion.

20. The method according to claim 16, wherein said digital radiation image is a digital radiation image produced by objecting to predetermined processes the radiation image recorded with a phosphor material that emits stimulated light in proportion to the exposed dose of the radiation, said value of evaluation is an NEQ value for evaluating the image quality of digital radiation image, said correction curve for the value of evaluation to the exposed dose of the radiation X is expressed as $1/(C/X+D)$ (where C and D are constants) and constructed by determining the constants C and D from said at least two values of evaluation.

21. The method according to claim 16, wherein granularity is evaluated in terms of the square value of RMS granularity or the value of a Weiner spectrum for each dose of exposure to x-rays.

22. The method according to claim 16, wherein split recording is performed by:

covering a specified area of the radiation image formed on a radiation detector with an x-ray opaque metal plate and illuminating the uncovered area of the radiation image with a predetermined dose of x-rays;

removing the lead plate and replacing the plate over another specified area of said radiation image;

illuminating the uncovered area of said radiation image with a different dose of x-rays; and repeating this procedure until the required number of images are recorded.

* * * * *